(12) United States Patent
Oroskar et al.

(10) Patent No.: US 8,238,906 B1
(45) Date of Patent: Aug. 7, 2012

(54) DYNAMIC PAGING CONCATENATION BASED ON THE LIKELIHOOD OF ROAMING

(75) Inventors: Siddharth S. Oroskar, Overland Park, KS (US); Sachin R. Vargantwar, Overland Park, KS (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 113 days.

(21) Appl. No.: 12/854,114

(22) Filed: Aug. 10, 2010

(51) Int. Cl.
H04W 88/02 (2009.01)

(52) U.S. Cl. ................ 455/432.1; 455/436

(58) Field of Classification Search ......... 455/432.1, 455/436–445
See application file for complete search history.

(56) References Cited

U.S. PATENT DOCUMENTS

| | | | |
|---|---|---|---|
| 5,369,681 A | 11/1994 | Boudreau et al. | |
| 6,181,945 B1 | 1/2001 | Lee | |
| 6,223,042 B1 | 4/2001 | Raffel | |
| 6,643,520 B1 | 11/2003 | Park et al. | |
| 6,745,039 B1 | 6/2004 | Di Lalla | |
| 6,922,561 B2 | 7/2005 | Chen et al. | |
| 6,963,750 B1 | 11/2005 | Cheng | |
| 7,065,361 B1 | 6/2006 | Fortuna | |
| 7,260,415 B1 | 8/2007 | Oh | |
| 7,366,526 B2 | 4/2008 | Zhang et al. | |
| 2006/0058056 A1 | 3/2006 | Das et al. | |
| 2006/0251033 A1 | 11/2006 | Oprescu-Surcobe et al. | |
| 2007/0105535 A1 | 5/2007 | Jacobson et al. | |
| 2008/0025235 A1 | 1/2008 | Mahany et al. | |
| 2008/0032713 A1 | 2/2008 | Yang | |
| 2008/0096520 A1 | 4/2008 | Benco et al. | |
| 2008/0293419 A1 | 11/2008 | Somasundaram et al. | |
| 2008/0293437 A1 | 11/2008 | Ranganathan et al. | |
| 2009/0061854 A1 | 3/2009 | Gillot et al. | |
| 2009/0247137 A1 | 10/2009 | Awad | |
| 2010/0311420 A1* | 12/2010 | Reza et al. | 455/436 |
| 2011/0021197 A1* | 1/2011 | Ngai | 455/436 |
| 2011/0034167 A1* | 2/2011 | Ben-Shaul et al. | 455/432.1 |

OTHER PUBLICATIONS

Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".
Unpublished U.S. Appl. No. 12/572,829, filed Oct. 2, 2009 entitled "Overflow Pages in Heavily Loaded Slots".
Unpublished U.S. Appl. No. 12/776,287, filed May 7, 2010 entitled "Dynamic Paging for Hybrid Mobile Stations".
Unpublished U.S. Appl. No. 12/786,174, filed May 24, 2010 entitled "Dynamic Paging Concatenation Based on Page-Type".

(Continued)

Primary Examiner — Diane Mizrahi

(57) ABSTRACT

Methods and systems for reducing the frequency of handoffs to non-preferred wireless coverage areas are presented. In particular, a RAN may determine that a WCD is likely to begin roaming. The WCD may be served by a preferred wireless coverage area and may be likely to roam to a non-preferred wireless coverage area. In order to avoid drawbacks associated with letting the WCD roam, the RAN may grant the WCD one or more forms of increased service quality. For example, the RAN may use a roaming-likelihood value as a basis for determining a page-concatenation level for the page, concatenate the page according to the determined page-concatenation level, and then transmit the page.

20 Claims, 6 Drawing Sheets

OTHER PUBLICATIONS

Unpublished U.S. Appl. No. 12/756,027, filed Apr. 7, 2010 entitled "Paging Power Control Based on Page Concatenation".
Unpublished U.S. Appl. No. 12/786,184, filed May 24, 2010 entitled "Dynamic Adjustment of Paging Power Based on Page-Type".
Unpublished U.S. Appl. No. 12/854,119, filed Aug. 10, 2010 entitled "Paging Scheme Settings of Switch Based on Likelihood of Roaming".
Unpublished U.S. Appl. No. 12/261,229, filed Oct. 30, 2008 entitled "Method and System of Roaming".
U.S. Appl. No. 12/786,174, filed May 24, 2010.
Office Action, U.S. Appl. No. 12/853,730 mailed Jan. 18, 2012.
Unpublished U.S. Appl. No. 12/853,730, filed Aug. 10, 2010 entitled "Reducing the Usage of Non-Preferred Wireless Coverage Areas".

* cited by examiner

FIG. 3

| WCD IDENTIFIER | RECENT VISITS (CALLS) | RECENT VISITS (CALLS) RESULTING IN RAPID HANDOFF | PERCENTAGE |
|---|---|---|---|
| 312-555-1000 | 5 | 0 | 0% |
| 312-555-1001 | 14 | 7 | 50% |
| 312-555-1002 | 80 | 8 | 10% |
| 312-555-1003 | 3 | 3 | 100% |

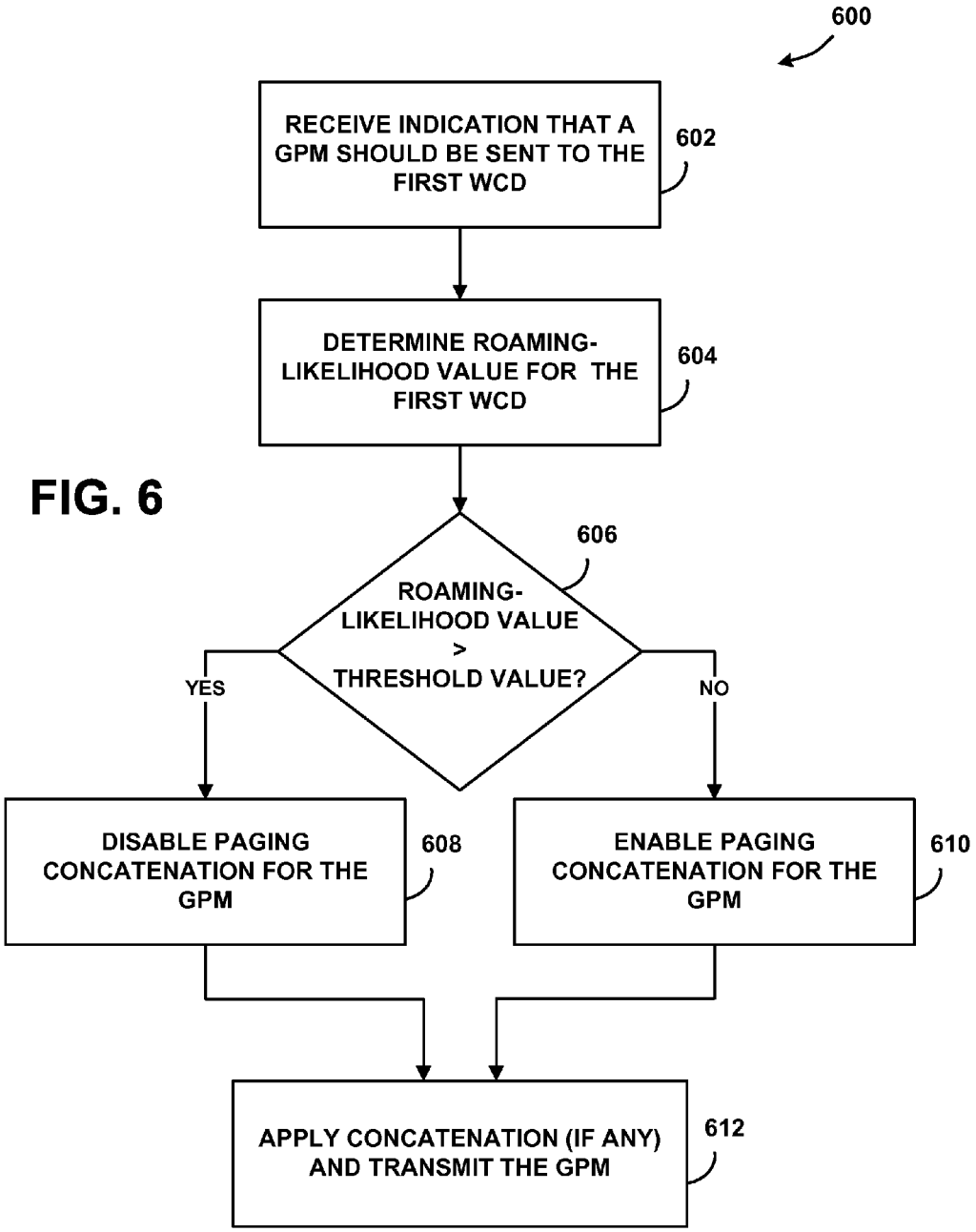

DYNAMIC PAGING CONCATENATION BASED ON THE LIKELIHOOD OF ROAMING

BACKGROUND

Wireless service providers typically design their wireless networks to comprise a number of partially-overlapping wireless coverage areas. As a wireless communication device (WCD) that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage.

However, it is not economically feasible for any given wireless service provider to deploy perfect wireless coverage. Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Consequently, the roaming partner provides wireless service for the WCD for a period of time, typically until the wireless service provider can once again provide a reasonable wireless coverage to a WCD.

While roaming agreements may result in a better overall wireless coverage for WCDs, and therefore a better experience for WCD users, there are drawbacks to letting a WCD roam. One such drawback is that, while roaming, the WCD may not have access to applications and services offered by the wireless service provider. Another drawback to roaming is that the roaming partner may charge the wireless service provider a fee for each unit of time, unit of data, or transaction that the roaming partner serves a roaming WCD. Other drawbacks may exist as well.

OVERVIEW

According to the embodiments herein, a wireless service provider may be able to determine when one or more of its subscribed WCDs is likely to roam. Then, the wireless service provider may proactively take steps to reduce the likelihood of this roaming.

In these embodiments, the wireless service provider may operate and/or control a RAN that provides a preferred wireless coverage area to serve WCDs. The wireless service provider may categorize wireless coverage areas that the wireless service provider operates and/or controls as "preferred," while categorizing wireless coverage areas that the wireless service provider's roaming partners operate and/or control as "non-preferred." In order to avoid handing off a WCD to a non-preferred wireless coverage area, the wireless service provider may consider roaming data associated with the WCD when determining whether to take steps to decrease the likelihood of the handoff occurring. This roaming data may be, for instance, historical data representing the WCD's past handoff behavior.

Accordingly, in an example embodiment, the RAN may determine that the roaming data indicates that a given WCD, served by the preferred wireless coverage area, is likely to soon begin roaming to a non-preferred coverage area. In response to making this determination, the RAN may grant the given WCD an increased service quality so that the given WCD is less likely to begin roaming. For instance, the roaming data may indicate that the given WCD has been handed off from the preferred wireless coverage area to non-preferred coverage areas with some degree of frequency in the past. The increase of service quality may involve the RAN adjusting any communication parameter between itself and the given WCD. For example, the RAN may boost the power of an air interface channel of the preferred wireless coverage area, so that the given WCD is better served by the preferred wireless coverage area, and therefore is less likely to be handed off. As a result, the wireless service provider may avoid being charged roaming fees. As another example, the RAN may adjust paging parameters so as to increase the likelihood that a page is successfully received in a preferred wireless coverage area, in effort to prevent a WCD from establishing a call in a non-preferred wireless coverage area. Additionally, the WCD may be able to continue making use of services offered by the wireless service provider.

These and other aspects and advantages will become apparent to those of ordinary skill in the art by reading the following detailed description, with reference where appropriate to the accompanying drawings. Further, it should be understood that the foregoing overview is merely for purposes of example and is not intended to limit the scope of the invention as claimed.

BRIEF DESCRIPTION OF THE DRAWINGS

FIG. 3 is a table containing historical handoff data associated with several WCD identifiers, in accordance with an example embodiment;

FIG. 6 is another flow chart, in accordance with an example embodiment.

DESCRIPTION

Disclosed herein are methods and devices for reducing the usage of non-preferred wireless coverage areas. Employing various embodiments of the present invention, a wireless service provider may be able to, in some cases, avoid the usage of non-preferred wireless coverage by its subscribed WCDs. In turn, this may reduce the roaming fees that the wireless service provider is charged by other wireless service providers (e.g., roaming partners).

It should be noted that the term "handoff" is to be interpreted broadly herein. Thus, a WCD being "handed off" from a preferred wireless coverage area to a non-preferred wireless coverage area may include scenarios in which (i) the WCD is participating in communication via the preferred wireless coverage area when the handoff occurs, (ii) the WCD is not participating in communication via the preferred wireless coverage area when the handoff occurs, and (iii) the WCD engages in a first call via a preferred wireless coverage area, the first call is terminated, and soon after the WCD engages in a second call via a non-preferred wireless coverage area.

I. NETWORK ARCHITECTURE

Figure 1:
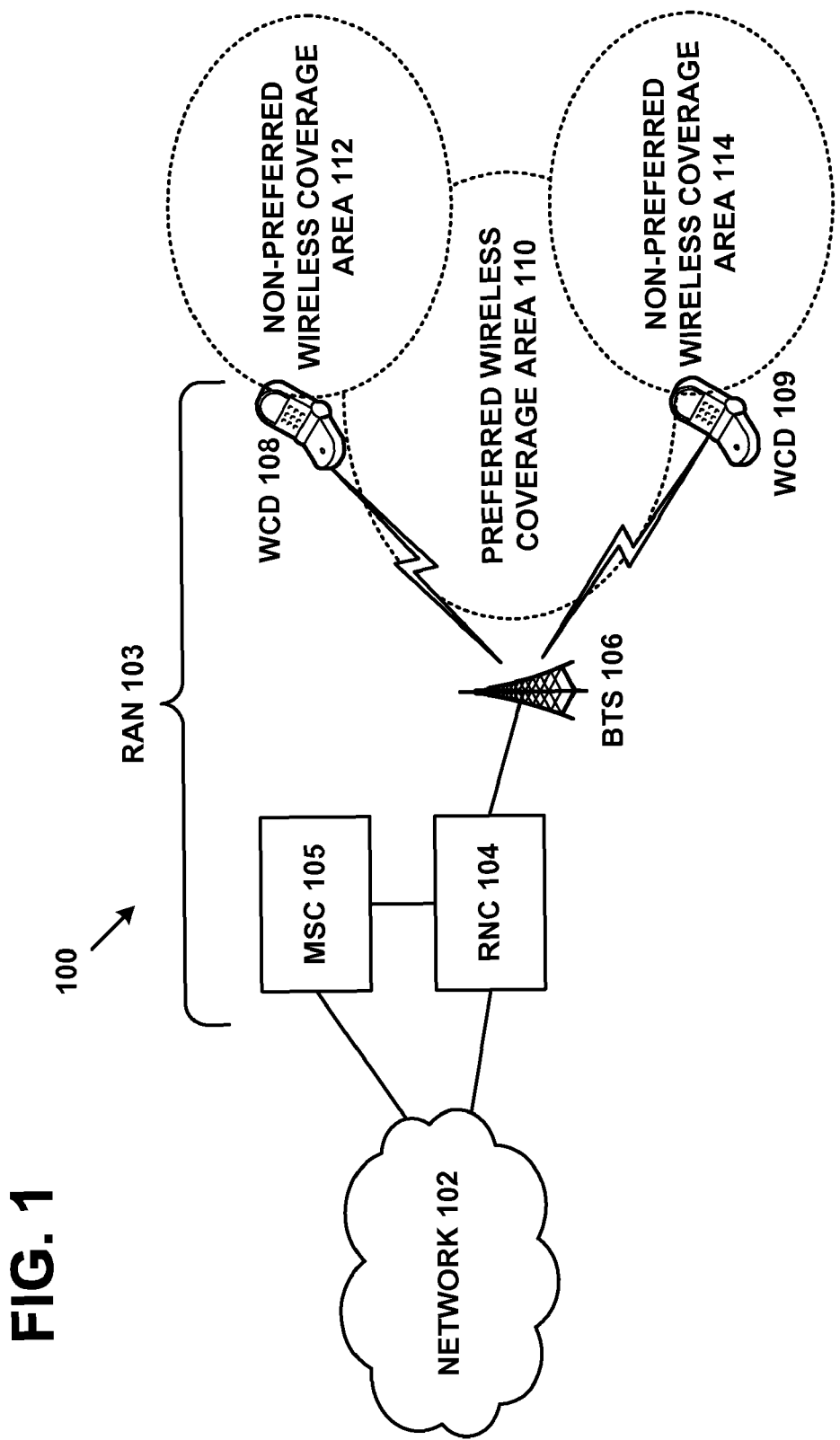
FIG. 1 depicts a RAN controlling a preferred wireless coverage area that is within range of several non-preferred wireless coverage areas, in accordance with an example embodiment.

FIG. 1 depicts an example communication system 100 in which the embodiments herein can be carried out or deployed. At a high level, communication system 100 comprises a network 102, a RAN 103, a preferred wireless coverage area 110, and non-preferred wireless coverage areas 112 and 114. Any of the wireless coverage areas may provide wireless communication services to WCD 108 and/or WCD 109.

Network 102 is preferably a packet-switched and/or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks. In one possible embodiment, network 102 includes both packet-switching and circuit-switching capabilities.

RAN 103 may include a radio network controller (RNC) 104, a mobile switching center (MSC) 105, a base transceiver station (BTS) 106, and other RAN components. However, for sake of simplicity, FIG. 1 excludes some of these components, such as softswitches, media gateways, media gateway controllers, signaling nodes, authentication servers, registration servers, and so on. Furthermore, throughout this description, the term "RAN component" may be used to refer to a BTS, an RNC, a combination of one or more BTSs and an RNC, or any other type of component used for RAN functionality.

BTS 106 may radiate on one or more frequencies to define preferred wireless coverage area 110. Preferred wireless coverage area 110, may, in turn, serve WCD 108 and/or WCD 109. To supply wireless service to these WCDs, as well as other WCDs, preferred wireless coverage area 110 may include an air interface that comprises one or more forward link and/or reverse link channels. Through the forward and reverse link channels, BTS 106 and WCD 108 and/or WCD 109 may exchange signaling and bearer traffic.

In one possible embodiment, these channels may be formed via a set of orthogonal Code Division Multiple Access (CDMA) codes, each of which may be used to modulate the data transmitted on a particular channel. However, other embodiments using different technologies are also possible. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi). Thus, RAN 103 may operate according to one or more of CDMA, any of these other technologies, and/or additional technologies now known or developed in the future.

BTS 106 may include a power amplifier, such as a tower-top amplifier (and possibly multiple power amplifiers, with one for each wireless coverage area BTS 106 defines), arranged to amplify signals for transmission over the respective air interface to WCDs. Preferably, the power amplifier has a variable gain that can be set by a control signal received from a controller such as RNC 104.

The forward link channels, which carry data from BTS 106 to WCD 108 and from BTS 106 to WCD 109, may include a pilot channel, over which a phase offset pattern is repeatedly transmitted, a sync channel over which synchronization data, such as a timing reference, is transmitted, and traffic channels over which bearer traffic directed to WCD 108 and/or WCD 109 is transmitted. Additionally, one or more of the forward link channels may be designated as primary and/or secondary paging channels, and may be used for contacting WCDs.

The reverse link channels, which carry data from WCDs 108 and 109 to BTS 106, may also be formed through the use of CDMA or other technologies. These reverse link channels may include, for example, an access channel for responding to paging messages and for initiating communications, and reverse traffic channels for transmitting bearer traffic from WCD 108 to BTS 106 and from WCD 109 to BTS 106.

RNC 104 may perform a variety of tasks, including management of the wireless resources associated with BTS 106, and routing of traffic to and from BTS 106. Further, RNC 104 may be able to facilitate handoff of WCD 108 and/or WCD 109 from one wireless coverage area to another (e.g., between preferred wireless coverage area 110 and one of the non-preferred wireless coverage areas). RNC 104 may be communicatively coupled to network 102 either directly or via one or more links or other devices. For instance, RNC 104 may communicate with network 102 via MSC 105 or via an access gateway (not shown), such as a packet data serving node (PDSN) or an access serving network gateway (ASN-GW). In addition to or instead of an RNC such as RNC 104, a base station controller (BSC), or some other type of device, may be used for at least some RNC functions.

MSC 105 may perform many of the functions of a Class 5 telephony switch, but with additional functionality to manage the mobility of subscriber devices, such as WCD 108 and 109. For example, MSC 105 may comprise or be communicatively coupled with a visitor location register (VLR) and a home location register (HLR). MSC 105 may be responsible for switching functions, media transport functions, transcoding functions, short message service (SMS) functions, and managing the communications between WCDs and any the circuit switched functions of network 102 or other networks.

Furthermore, MSC 105 may track subscriber usage to facilitate billing and performance monitoring. To do so, for each call that the MSC 105 handles, MSC 105 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 105 may transmit these CDRs to a central entity that maintains a database in which the CDRs are compiled. It should be understood that RAN components other than MSCs may generate CDRs in addition to or instead of MSC 105 generating CDRs.

WCD 108 and WCD 109 may be two of potentially many WCDs served by preferred wireless coverage area 110. Such WCDs could be a wireless telephone, a wireless personal digital assistant, a wirelessly equipped laptop computer, a wireless router, or another type of mobile or fixed wireless device. Preferably, a WCD is a subscriber device that is manipulated by a human in order to establish and engage in circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes, other WCDs, and other communication devices (e.g., wireline phones). Further, a WCD may be in communication with one or more preferred and/or non-preferred wireless coverage areas simultaneously, even if the WCD is only using one of these wireless coverage areas to communicate with the correspondent nodes.

Receiving signals from multiple wireless coverage areas simultaneously may provide advantages for a WCD. For instance, doing so allows the WCD to keep track of neighboring wireless coverage areas that are candidates for a handoff. Regularly, or from time to time, the WCD may measure the strength of the signals received from each wireless coverage area. These signals may be received on a traffic channel, a paging channel, or some other type of channel, and the measurements may involve determining the signal-to-noise ratio (SNR) and/or the frame error rate (FER) of the signals. When a WCD is served by a given wireless coverage area and determines that the signal strength the WCD received from this given wireless coverage area has dropped below a signal-strength threshold, the WCD may request a handoff from the given wireless coverage area to a new wireless coverage area from which the WCD has received a higher signal strength. The WCD may also request a handoff to a new wireless coverage area when the received signal strength of the new wireless coverage area exceeds that of the given wireless coverage area by some amount. As a result of measuring this received signal strength and using these measurements to influence handoff behavior, handoffs may be faster and less disruptive. For instance, the WCD may be handed off from the given wireless coverage area before it experiences a poor signal strength from the given wireless coverage area that substantially compromises the WCD's ability to communicate.

Preferred wireless coverage area 110 may be defined by BTS 106 radiating on one or more frequencies. Similarly, BTSs that are under the control of other entities may radiate on one or more frequencies to define non-preferred wireless coverage areas 112 and 114. The frequencies used to define each of these wireless coverage areas may be non-overlapping in order to reduce interference. Alternatively, the frequencies used by these wireless coverage areas may overlap with one another to some extent.

Although three wireless coverage areas are shown in FIG. 1, the embodiments herein may make use of more or fewer wireless coverage areas. For example, RAN 103 may radiate to define more than one preferred wireless coverage area. Similarly, there may be only one or more than two non-preferred wireless coverage areas. While FIG. 1 depicts the physical coverage of preferred wireless coverage area 110 partially overlapping with that of non-preferred wireless coverage areas 112 and 114, preferred wireless coverage area 110 may overlap with these non-preferred wireless coverage areas more or less than is shown. Thus, for instance, preferred wireless coverage area 110 may fully overlap or not overlap at all with one or more of non-preferred wireless coverage areas 112 and 114.

It should be understood that FIG. 1 is presented merely for purposes of example, and that communication network 100 may comprise more or fewer components in different arrangements than shown. Further, each of these devices, such as RNC 104, MSC 105, and BTS 106, may include multiple physical or logical components arranged to operate in conjunction with one another. Alternatively or additionally, these devices may be able to be combined with one another into a smaller number of logical or physical devices. In sum, changes may be made to the arrangement illustrated by FIG. 1 without departing from the scope of the invention.

II. RAN COMPONENT EMBODIMENT

Figure 2:
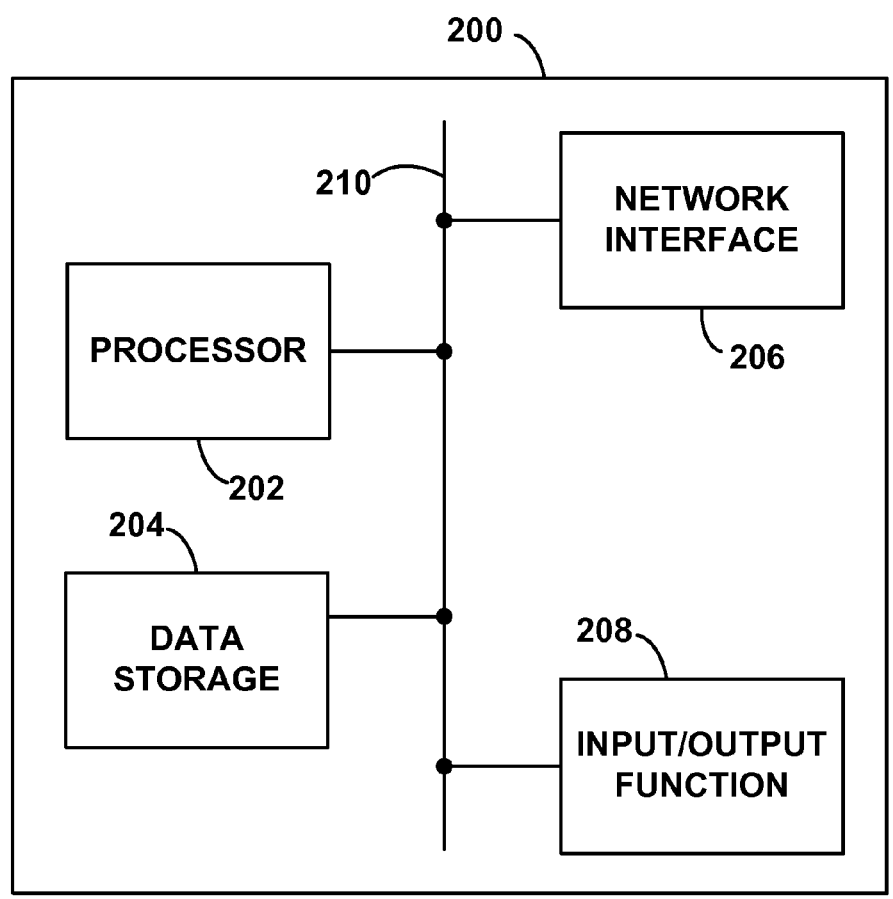
FIG. 2 is a block diagram of a RAN component, in accordance with an example embodiment.

FIG. 2 is a simplified block diagram exemplifying a RAN component 200, and illustrating some of the functional components that would likely be found in a RAN component arranged to operate in accordance with the embodiments herein. Example RAN component 200 could be any type of device found in or associated with a RAN, such as a BTS, an RNC, and/or an MSC.

Example RAN component 200 preferably includes a processor 202, a data storage 204, a network interface 206, and an input/output function 208, all of which may be coupled together by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.)

Data storage 204, in turn, may comprise volatile and/or non-volatile memory and can be integrated in whole or in part with processor 202. Data storage 204 preferably holds program instructions, executable by processor 202, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example RAN component 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, example RAN component 200 may support remote access from another device, via network interface 206 or via another interface (not shown), such an RS-232 or USB port.

III. PAGING FUNCTIONALITY

When a RAN seeks to communicate with a WCD (e.g., to establish an incoming voice call or transmit incoming packet data), the RAN may first page the WCD on a paging channel. The purpose of paging the WCD may be to determine whether the WCD is still within range of a preferred wireless coverage area, and if so, to notify the WCD of the incoming communication. If the WCD is successfully paged, the RAN may assign one or more traffic channels to WCD.

Preferably, a paging channel comprises one or more of the forward links supported by the preferred wireless coverage area. The paging channel may operate in a slotted manner, according to time-division multiplexing (TDM), and multiple WCDs may be grouped together and assigned to the same paging channel slot. Each paging channel slot is typically divided into four frames, each of which comprises two half-frames, resulting in a total of eight half-frames per paging channel slot. In a given paging channel slot, the RAN preferably transmits one or more general paging messages (GPMs), each containing information sufficient to identify which WCD or WCDs of the group (if any) are being paged. Thus, a WCD served by the preferred wireless coverage area may periodically listen to its assigned paging channel slot to determine whether the RAN is seeking to page the WCD.

Paging is typically initiated when an MSC receives an indication that a WCD should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and a mobile equipment identifier (MEID). The MSC may then transmit some representation of the indication to the appropriate BTS or BTSs. In turn, the BTS may use the WCD identifier to generate a page record, which the BTS may then place in a GPM for transmission to the WCD. (A GPM may also be referred to as a "page-request message" or just a "page.")

Each page record may contain error detection bits, such as a checksum. Thus, once the WCD receives such a GPM, the WCD typically will validate the checksum. If the checksum indicates that there are no bit errors in the page record, the WCD may reply with a page-response message (PRM) on the access channel. After receiving the PRM, the RAN may then assign the one or more traffic channels to the WCD. However, if the checksum indicates that one or more bits in the page record are in error, the WCD may discard the GPM.

A metric of the paging effectiveness of a wireless coverage area is the wireless coverage area's paging success rate (PSR). The more often paging procedures in the wireless coverage area result in the successful paging of a WCD, the higher the PSR. PSR may be measured for a coverage area as a whole (i.e., the percentage of all GPMs in a given coverage area to which a WCD responds with a PRM). However, PSR may also be measured on a per-WCD basis (e.g., the percentage of GPMs to a particular WCD to which the WCD responds with a PRM), or] on a per-WCD and per-coverage area basis (e.g., the percentage of GPMs to a particular WCD in a particular coverage area to which the WCD responds with a PRM).

Normally, a GPM occupies two half-frames of a paging channel slot, and therefore each paging channel slot would support at most four page records. However, multiple page records within a GPM may be concatenated so that more WCDs may be paged per GPM. For example, multiple page records can be concatenated so that they can be transmitted in a single GPM that occupies two or more half-frames. Thus, when the RAN uses paging concatenation, the RAN may be able to transmit at least five page records per paging channel slot.

While concatenating multiple page records in a GPM can reduce load on the paging channel, this concatenation can have a deleterious impact on PSR. In order for page records to be concatenated, some information, such as error detection bits, may not be included in each page record in a GPM. As a result, when a given WCD receives a GPM with one or more bit errors, the given WCD may discard the entire GPM, even if the section of the GPM containing a page record for the given WCD does not contain any bit errors. Thus, concatenation may result in some page records failing to reach their intended WCDs, thereby reducing the PSR. In practice, a two to three percent decrease in the PSR may result from concatenation.

IV. ROAMING AGREEMENTS BETWEEN WIRELESS SERVICE PROVIDERS

Turning back to FIG. 1, each WCD may be subscribed to, or otherwise associated with, a wireless service provider. Therefore, for instance, WCD 108 and WCD 109 may be subscribed to the wireless service provider that controls and/or operates preferred wireless coverage area 110. (For sake of clarity, hereinafter this wireless service provider will be referred to as the "home wireless service provider.") One way in which these subscriptions could be established is that a user of one of these WCDs may purchase or lease their WCD from the home wireless service provider. Then, for pre-determined fees, the WCD may be used to communicate via any of the home wireless service provider's wireless coverage areas. Alternatively, a user of the WCD may purchase or lease the WCD from a third-party entity, such as a wholesaler or reseller, and then register the WCD for service with the home wireless service provider.

In most cases, as noted above, it is not economically feasible for any given wireless service provider to deploy perfect wireless coverage. For instance, even a nationwide wireless service provider may not provide wireless coverage areas in sparsely-populated rural locations, or even in some urban or suburban locations. Also, in some circumstances, the signals from a wireless coverage area may not penetrate very far into buildings, leaving coverage gaps in these structures. Additionally, a wireless service provider may not be able to provide service to a WCD in a given location if the wireless service provider's wireless coverage areas are near or at full capacity in that location.

Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Roaming partners may be wireless service providers in their own right, and therefore may also serve their own subscribed WCDs. A roaming partner may provide wireless service to the WCD for a period of time, typically until the wireless service provider can once again provide a reasonable wireless coverage to the WCD. In FIG. 1, non-preferred wireless coverage areas 112 and 114 may be controlled and/or operated by one or more roaming partners of the home wireless service provider.

It may be advantageous for the home wireless service provider to have one or more roaming partners, because allowing WCD 108 and/or WCD 109 to use these roaming partners' wireless service areas may increase the overall wireless coverage available to WCD 108 and/or WCD 109, thereby increasing customer satisfaction. However, roaming agreements between wireless service providers often involve an assessment of fees. For example, a roaming partner of the home wireless service provider may charge the home wireless service provider a fee when WCD 108 or WCD 109 uses one or more of the roaming partner's wireless coverage areas. Typically, no fees are charged if a roaming WCD is idle. But, if the roaming WCD makes a substantial use of the roaming partner's wireless coverage area(s), the home wireless service provider may be charged for that use. Such a substantial use might include, for example, making a voice or data call, or transmitting or receiving a text or multimedia message.

The fee for this use may be assessed on a per-time-unit basis, per-data-unit basis, per transaction basis, or some other basis. Thus, for example, if a WCD participated in a voice or data call while roaming, a fee may be assessed based on the number of minutes (or fractions of minutes) that the call lasted (e.g., three cents per minute). Alternatively, the fee may be assessed based on the amount of data transferred to and/or from the WCD during the course of the call (e.g., twenty-five cents per megabyte of data sent or received by the WCD). For some applications or services, such as text or multimedia messaging, fees may be assessed on a per-transaction basis (e.g., ten cents per text message).

While the home wireless service provider can pass on some or all of these roaming fees to the user of the WCD, doing so may lead to the user becoming frustrated with the home wireless service provider. Thus, it may be advantageous for the home wireless service provider to try to reduce the extent of roaming so that roaming fees are reduced. The effect of doing so may be lower costs paid by the home wireless service provider and/or users, ultimately resulting in higher user satisfaction with the home wireless service provider.

One way for the home service provider to reduce the likelihood that subscribed WCDs begin roaming is to detect, based on roaming data, when a particular WCD is likely to begin roaming. Once this likelihood of roaming is detected, the home service provider may take steps to reduce the likelihood that the particular WCD begins roaming.

To that point, in FIG. 1, WCD 108 may be served by preferred wireless coverage area 110. If, in the past, WCD 108 has exhibited a tendency to begin roaming to an adjacent non-preferred wireless coverage area while served by preferred wireless coverage area 110, then it may be likely that WCD 108 will do so again. For instance, suppose that WCD 108 has been served by preferred wireless coverage area 110 ten times in the last week. If, out of these ten occasions, WCD 108 roamed from preferred wireless coverage area 110 to non-preferred wireless coverage area 112 five times and to non-preferred wireless coverage area 114 two times, then WCD 108 has demonstrated a tendency to roam. In this case, 70% of the time that WCD 108 was served by preferred wireless coverage area 110, WCD 108 began roaming to a wireless coverage area of a roaming partner.

There are several possible reasons for why WCD 108 could exhibit this behavior. One reason may be that WCD 108 may have hardware, software, or mechanical characteristics that make it difficult for WCD 108 to transmit or receive properly on the frequency or frequencies used by preferred wireless coverage area 110. For example, WCD 108 might be a relatively old model with a transceiver that has deteriorated over time. Even if WCD 108 is not able to transmit or receive properly via preferred wireless coverage area 110, WCD 108 may be able to transmit and receive properly on other preferred or non-preferred wireless coverage areas. For instance, WCD 108 may be able to communicate with fewer problems when using the frequencies of non-preferred wireless coverage areas 112 and 114. In other words, communication problems that WCD 108 experiences in preferred wireless coverage area 110 may or may not occur in other wireless coverage areas.

Another possible reason for WCD 108 being handed off to a non-preferred wireless coverage area with some frequency could be the physical location in which WCD 108 is typically used. For instance, a user of WCD 108 may live, work, or spend a substantial amount of time near a border of preferred wireless coverage area 110. Due to this physical proximity to the border, the signal strength of preferred wireless coverage area 110 received by WCD 108 may be poor. Alternatively, the user of WCD 108 may spend a substantial amount of time in a physical location within the bounds of preferred wireless coverage area 110, but still receive a poor signal strength from this wireless coverage area. For example, this location could be a basement or the center of a large structure. As another example, the user of the WCD may simply be a highly mobile user, or may be highly mobile in a particular region. Under such conditions, WCD 108 may frequently roam to one of non-preferred wireless coverage areas 112 and 114.

For any of these reasons, or for other reasons, the historical roaming data of a WCD, such as WCD 108, may indicate that the WCD is likely to roam from a preferred wireless coverage area to a non-preferred wireless coverage area again in the future. In order to avoid this sort of roaming in at least some situations, a RAN, such as RAN 103, may contain logic that (i) determines that a given WCD is likely to begin roaming to a non-preferred wireless coverage area, and (ii) in response to making this determination, takes steps to reduce the likelihood that the WCD begins roaming.

a. Detecting that a WCD is Likely to Begin Roaming to a Non-Preferred Wireless Coverage Area In order to detect that a WCD is likely to begin roaming, a RAN may collect data regarding when the WCD engages in a handoff. To that end, there may be multiple ways through which the RAN can learn that a WCD has been handed off. For instance, during the handoff process, the WCD may inform the RAN of the non-preferred wireless coverage area to which the WCD is being handed off. Alternatively, the RAN may receive, from the roaming partner that controls the non-preferred wireless coverage area, signaling messages indicating that the WCD has been handed off to the non-preferred wireless coverage area.

However, if the RAN does not receive an explicit indication that the WCD was handed off, the RAN may infer that a handoff occurred. For example, the WCD may be taking part in a call via the preferred wireless coverage area. The RAN may receive an indication that a call leg between the RAN and the WCD was terminated, and may record the time of the termination, as well as the caller, callee, an identifier of the preferred wireless coverage area, and related information. (It should be understood that a call leg is segment of a call between two endpoints. Thus, when the WCD is handed off from a first BTS to a second BTS, the WCD may maintain the end-to-end call, but replace the call leg between the WCD and the first BTS with a call leg between the WCD and the second BTS.) At a later point in time (e.g., minutes, hours, or days after the call was terminated), the home wireless service provider may receive records of call legs and/or calls engaged in by the home wireless service provider's subscribed mobiles in roaming partners' wireless coverage areas. These records may take the form of CDRs.

By correlating these received records with similar records recorded by the RAN, the home wireless service provider may be able to determine whether a WCD that took part in a call via the preferred wireless coverage area was rapidly handed off to a non-preferred wireless coverage area and took part in another call via the non-preferred wireless coverage area. For instance, the RAN may compare the caller and callee of a terminated call leg that took place in the preferred wireless coverage area to the caller and callee of call leg that subsequently took place in the non-preferred wireless coverage area. If the parties that took part in these calls are the same, this may indicate that the call was handed off from the preferred wireless coverage area to the non-preferred wireless coverage area, or that the call was dropped during the course of such a handoff, and then reestablished via the non-preferred wireless coverage area. Regardless, if the time between the call being terminated in the preferred wireless coverage area and a corresponding call being initiated in the non-preferred wireless coverage area is below a threshold value, the RAN may consider these events to be a "handoff."

The communication of CDRs from the roaming partner to the home service provider may be direct or may take place via a third party billing aggregator. The records may be formatted according to Transferred Account Procedure (TAP) or Cellular Intercarrier Billing Exchange Roamer (CIBER). Such records may comprise call detail records for each call or call leg made by a roaming WCD, including the WCD's location, the calling party, the called party, the time of the call, and the duration of the call.

In order to efficiently use such historical roaming data, the RAN may have access to information such as that in FIG. 3. Table 300 in FIG. 3 contains entries 302, 304, 306, and 308 of example data that could assist a RAN in performing this task. For each entry, table 300 stores a WCD identifier, a number of recent visits/calls, another number of recent visits/calls resulting in a rapid handoff to a non-preferred wireless coverage area, and a percentage.

A table like table 300 may be maintained for each preferred wireless coverage area. Further, a database storing data such as that of table 300 may be maintained by a service provider, or by a third party entity. Thus, the data may be maintained at an existing RAN component, at a standalone RAN component, or at a separate component to which the RAN has access. The information in table 300 may be presented or stored in other ways as well. As an alternative, the RAN may not have direct access to such a table, and may instead retrieve historical roaming data on an as-needed basis.

With respect to the contents of table 300, a WCD identifier may be a string of characters or bits that can be used to identify a WCD. As noted above, examples of WCD identifiers include NAIs, MDNs, MINs, IMSIs, ESNs, and MEIDs. Any of these types of WCD identifiers, or other data that can be used to identify WCDs, may be used in the "WCD identifier" column of table 300. For purposes of simplicity, entries 302, 304, 306, and 308 contain MDNs (phone numbers) as WCD identifiers, but other types of WCD identifiers may be used instead.

An entry in the "recent visits (calls)" column may be a count of recent visits that the WCD made to the preferred wireless coverage area. Such a visit may entail a WCD registering for service with the preferred wireless coverage area, but not necessarily making any calls in the preferred wireless coverage area. On the other hand, an entry in the recent visits/calls column may be a count of recent calls that the WCD made using resources of the preferred wireless coverage area. Such a call might be a voice call, a data call, or some other type of communication.

An entry in the "recent visits (calls) resulting in rapid handoff" column may be a count of recent visits that the WCD made to the preferred wireless coverage area wherein, during or after these visits, the WCD was handed off to a non-preferred wireless coverage area within a relatively short period of time. Alternatively, an entry in this column may be count of recent calls that the WCD made, using the resources of the preferred wireless coverage area, in which the WCD was handed off to a non-preferred wireless coverage area within a relatively short period of time after call initiation. Preferably, this column measures the same types of event (i.e., calls or visits) that the "recent calls (visits)" column measures.

Regardless of how calls or visits are measured, the "recent visits (calls) resulting in rapid handoff" column may be used to determine how frequently in the past that the WCD with the specified WCD identifier either registered for service with the preferred wireless coverage area and was rapidly handed off, or used resources of the preferred wireless coverage area and was rapidly handed off. If either event or both events occurs frequently, this may indicate that the WCD is likely to be handed off from the preferred wireless coverage area to a non-preferred wireless coverage area.

For example, a WCD may register for service in the preferred wireless coverage area. Whether or not the WCD actually uses any bearer resources of the preferred wireless coverage area, the RAN may record the time of this registration. Accordingly, the RAN may increment the WCD's entry in the "recent visits (calls)" column of table 300. Then, the RAN may determine that the WCD has been handed off to a non-preferred wireless coverage area, and may record the time of the handoff. If the time between these two recorded events is less than a threshold duration (e.g., a few seconds to a few minutes), the RAN may deem the WCD to have been rapidly handed off to a non-preferred wireless coverage area. Therefore, the RAN may increment the WCD's entry in the "recent visits (calls) resulting in rapid handoff" column.

An entry in the "percentage" column of table 300 indicates, for the WCD with the specified WCD identifier, the percentage of recent visits (calls) that were rapidly handed off to a non-preferred, wireless coverage area. Preferably, these entries result from dividing the WCD's entry in the "recent visits (calls) resulting in rapid handoff" by the WCD's entry in the "recent visits (calls)" column.

For instance, in record 302 for WCD identifier 312-555-1000, out of 5 recent visits (calls), none resulted in such a rapid handoff. Thus, the entry in the "percentage" column is 0%, indicating that the WCD with this identifier is unlikely to be handed off to a non-preferred wireless coverage area in the future. Similarly, in record 306 for WCD identifier 312-555-1002, the entry in the "percentage" column is 10%, also indicating that the WCD with this identifier is unlikely to be handed off to a non-preferred wireless coverage area in the future. On the other hand, the entries in the "percentage" column for records 304 and 308 are 50% and 100%, respectively. Thus, the WCDs with the identifiers 312-555-1001 and 312-555-1003 are likely to be handed off to a non-preferred wireless coverage area again in the future.

In practice, because of the large number of WCDs that typically subscribe with a given service provider, the size of a roaming-data database, such as table 300, may be quite large. Accordingly, in a further aspect, a switch may pre-load or cache roaming data for WCDs registered in its coverage area. For example, when a WCD registers with the RAN in a coverage area served by a given switch, the switch may look up the roaming data for the WCD in that coverage area. The switch may then store the roaming data for the WCD in local data storage (i.e., data storage located at the switch) so that it is readily available in the event that the switch needs to page the WCD.

While the likelihood of roaming for a given WCD is preferably based on that WCD's roaming data for the coverage area in which the WCD is located, it also possible that the likelihood of roaming may be calculated based upon historical roaming data for all WCDs in a given coverage area. In such an embodiment, the likelihood of roaming for a given WCD may simply be the overall roaming-likelihood indicator for the coverage area in which the WCD is registered. Since the overall roaming-likelihood indicator does not indicate roaming tendency on a per-WCD basis, the overall roaming-likelihood indicator for a given WCD registered in a given coverage area will be the same as for all other WCDs registered in the coverage area.

It should be understood that table 300 contains examples of the type of information that a home wireless service provider might use to determine whether a WCD is likely to roam. Thus, table 300 may include more or fewer columns or rows, each containing potentially different information than is shown in table 300. For instance, contents of the "percentage" column could be integer values or non-integer values, or could signify a percentage using other types of representations.

Moreover, in addition to the ways of detecting that a WCD is likely to begin roaming discussed above, there may be other ways of performing such detection that are in accordance with the embodiments herein.

b. Granting a WCD an Increased Service Quality

In response to determining that a WCD is likely to begin roaming, the RAN may grant the WCD an increased service quality so that the WCD is less likely to begin roaming. Generally speaking, this increased service quality can take any form. Examples may include any one or more of the following embodiments. Furthermore, it should be understood that granting the WCD an increased service quality does not necessarily mean that service quality for the WCD will actually improve. Rather, doing so involves changing parameters of communications and/or service for the WCD in effort to increase the service quality for the WCD, or in an effort to at least reduce the likelihood that the WCD is handed off to a non-preferred wireless coverage area.

As discussed in the context of FIG. 1, the air interface between a BTS and a WCD may comprise some number of forward link channels and/or reverse link channels. A RAN component controlling the BTS can potentially increase the service quality of the WCD by boosting the power of one or more of these channels. When a forward direction or reverse direction channel is operated at a higher power, communications between the BTS and the WCD are more likely to be successful.

Thus, in response to determining that a WCD is likely to begin roaming, the RAN may increase the power of one or more forward link channels, such as traffic channels. Additionally or alternatively, the RAN may instruct the WCD to increase the traffic channel bit error rate threshold or traffic channel frame error rate threshold above which the WCD may request a handoff to a different wireless coverage area. Doing so may also reduce the likelihood of roaming.

Also, given that paging communications between the RAN and WCDs served by the RAN typically make use of the paging channel and the access channel, boosting the power used to transmit on these channels may increase the likelihood that paging-related messages transmitted on these channels are successfully received, thereby increasing the PSR. (In order to trigger the WCD to increase the power at which the WCD transmits on the access channel, the RAN may use parameters within a GPM.) Of course, boosting power of these channels may also result the WCD receiving GPMs with a lower bit error rate or frame error rate, thereby reducing the likelihood that the WCD requests a handoff.

Moreover, paging procedures may involve the RAN transmitting two or more GPMs including a page record for a given WCD, before the RAN receives a corresponding PRM. Generally speaking, the more attempts to send a page made by a RAN, the more likely that the WCD will successfully receive the page Accordingly, in order to increase service quality of the WCD, the RAN may increase the number of times that paging messages are retransmitted before the RAN gives up.

Also, as noted above, concatenating page records in a GPM may result in a reduced PSR, and accordingly may also increase the chances of a handoff. Accordingly, in response to determining that the WCD is likely to begin roaming, RAN 103 may additionally or alternatively seek to increase service quality by reducing or disabling page concatenation for a page to a WCD that is likely to begin roaming. For example, a BTS may select a paging concatenation technique that involves a lesser extent of concatenation, or may simply disable concatenation entirely and transmit the page record in an un-concatenated form.

The RAN may also use other means to increase service quality to a given WCD that is likely to begin roaming. For example, if the given WCD is contending for RAN resources with other WCDs, the RAN may allocate the resources to the given WCD rather than the other WCDs. These resources could be, for instance, CDMA codes, TDM slots on a forward or reverse direction channel, or some measure of processing, memory, or link capacity. However, it should be understood that these examples are non-limiting and the RAN may increase service quality to the WCD through other methods, processes, or functions.

VI. EXAMPLE METHODS

Figure 4:
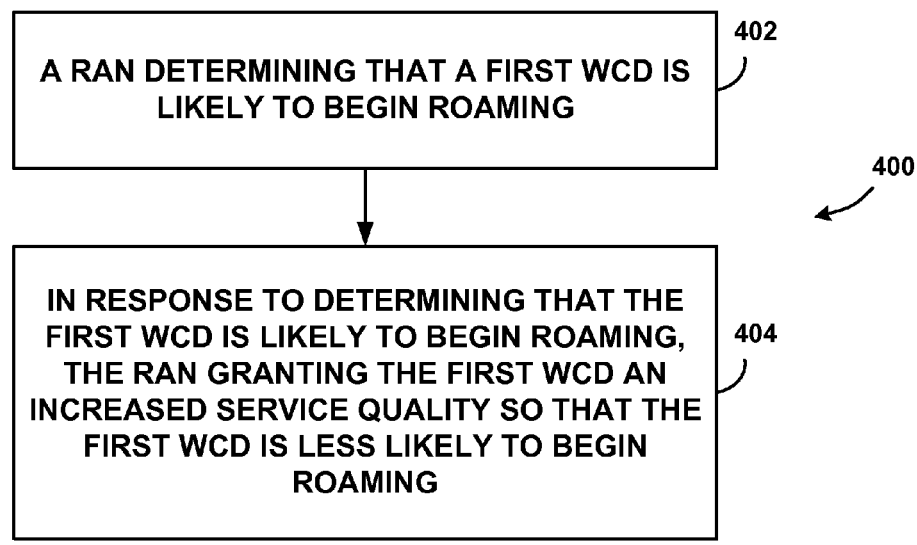
FIG. 4 is a flow chart, in accordance with an example embodiment.

FIG. 4 is a flow chart 400 illustrating a method, according to an example embodiment, that may help reduce the usage of non-preferred wireless coverage areas. At step 402, a RAN component, such as RNC 104, MSC 105, and/or BTS 106, may determine that a first WCD is likely to begin roaming. The WCD may be served by the RAN component via a preferred wireless coverage area.

To at least some extent, the RAN component may make this determination based on roaming data that indicates that the first WCD is likely to be handed off from the preferred wireless coverage area to any one of a group of one or more non-preferred wireless coverage areas. This roaming data may be represented as a table that maps WCD identifiers to respective handoff data associated with each respective WCD identifier. Thus, determining that the first WCD is likely to be handed off from the preferred wireless coverage area may include the RAN component (i) determining a given WCD identifier of the first WCD, (ii) looking up the determined given WCD identifier in the table, and (iii) determining that, in the past, the first WCD has been handed off from the preferred wireless coverage area to any one of the group of one or more non-preferred wireless coverage areas.

For instance, the given respective roaming data may include a percentage, associated with the given WCD identifier, representing how frequently the first WCD was handed off in the past from the preferred wireless coverage area to any one of the group of one or more non-preferred wireless coverage areas. If the percentage is greater than a threshold value, the RAN component may determine that the WCD is likely to begin roaming.

At step 404, in response to determining that the first WCD is likely to begin roaming, the RAN component may grant the first WCD an increased service quality. In one embodiment, the preferred wireless coverage area may include a paging channel that the RAN uses to contact the first WCD. In this embodiment, the RAN component may adjust parameters of at least one paging message transmitted on the paging channel in an effort to increase the RAN component's PSR. The adjustment of parameters may involve the RAN component increasing the power of paging messages transmitted to the first WCD on the paging channel.

If the RAN component determines that a second WCD also served by the preferred wireless coverage area is also likely to begin roaming, the RAN component may assign the second WCD to the same paging channel TDM slot to which the RAN component assigned the first WCD. Then, the RAN component may increase the power used to transmit paging messages in the given paging channel TDM slot.

In another embodiment, the RAN component may be arranged to transmit a default number of paging attempts to the first WCD on the paging channel before giving up trying to contact the WCD. In this case, adjusting parameters of at least one paging message transmitted on the paging channel may involve the RAN component increasing the default number of paging attempts to transmit to the first WCD on the paging channel.

In yet another embodiment, the preferred wireless coverage area may include a traffic channel that the RAN component uses to transmit bearer traffic to the first WCD. The RAN component may grant the first WCD an increased service quality by increasing the power used to transmit bearer traffic to the first WCD on the traffic channel. As a result, the first WCD may receive this bearer traffic with a lower frame error rate and/or bit error rate, and therefore would be less likely to begin roaming.

In an alternate embodiment that could be combined with any of the other embodiments herein, the first WCD may be configured with a traffic channel frame error rate threshold. When the WCD experiences a frame error rate on the traffic channel above the traffic channel frame error rate threshold, the WCD may stop using the traffic channel and request a handoff. Then, to reduce the likelihood that the WCD begins roaming, the RAN component may instruct the first WCD to increase the frame error rate threshold for the traffic channel.

In a further embodiment, the preferred wireless coverage area may include an access channel. The RAN component may normally instruct WCDs to transmit on the access channel at a default power level. In order to make it less likely that the first WCD begins roaming, the RAN component may instruct the first WCD to transmit on the access channel at above the default power level. Consequently, the RAN component may be more likely to receive PRMs from the WCD, and the RAN component's PSR may increase.

In an additional embodiment, when reserving resources of the preferred wireless coverage area for WCDs, the RAN component may give priority to the first WCD over other WCDs that are contending for these resources. The resources may be, for example, CDMA codes, TDM slots or some measure of processing, memory, or link capacity.

Figure 5:
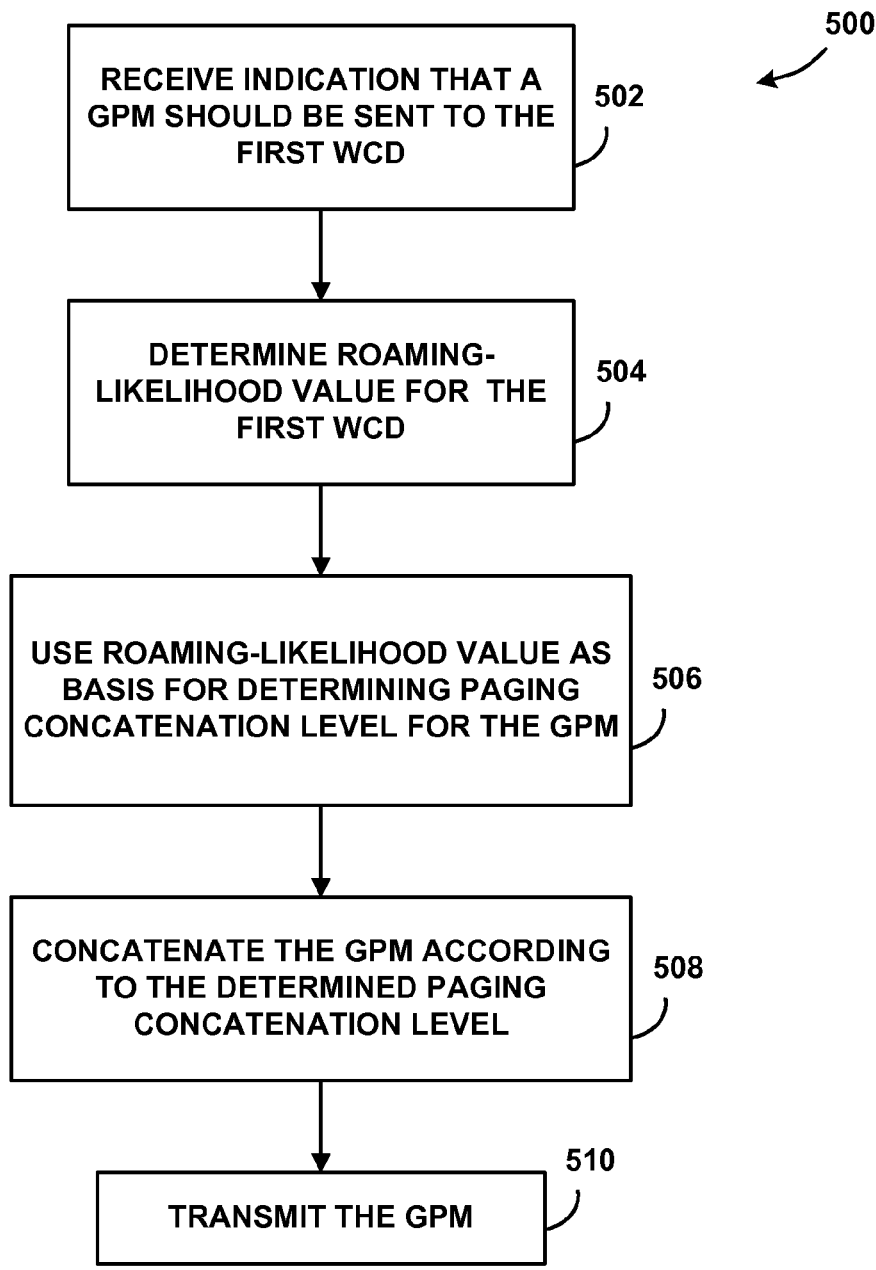
FIG. 5 is another flow chart, in accordance with an example embodiment.

FIG. 5 is a flow chart 500 illustrating a method according to an example embodiment that also may reduce roaming to non-preferred wireless coverage areas. In particular, the example embodiment of flow chart 500 may adjust paging concatenation in an effort to increase the PSR for WCDs that are likely to begin roaming, thereby reducing the likelihood that these WCDs roam.

At step 502, a RAN component may receive an indication (e.g., an incoming call) that a GPM should be sent to a first WCD in a preferred wireless coverage area operated by a first service provider. Responsive to receiving the indication, the RAN component may determine a roaming-likelihood value for the first WCD, as shown by step 504. The RAN component may then use the roaming-likelihood value as a basis to determine a paging concatenation level for the GPM, as shown by step 506. As such, the RAN component may then concatenate paging information according to the determined paging concatenation level, as shown by step 508, and transmit a GPM, as shown by step 510.

Preferably, the roaming-likelihood value indicates a likelihood that, while the first WCD is served by the preferred wireless coverage area, the first WCD will begin roaming to a non-preferred wireless coverage area. In an example embodiment, the roaming-likelihood value may be based on information associated with the WCD, such as the information in table 300. Thus, when a RAN component receives an incoming call for the first WCD (or otherwise determines that the first WCD needs to be paged), the RAN component may look up the roaming-likelihood value for the first WCD using a WCD identifier of the first WCD. The RAN component may then include the roaming-likelihood value as overhead information or metadata when it transmits a page record to a BTS for delivery to the WCD. Alternatively, the RAN component may transmit the roaming-likelihood value to the BTS as a separate message.

In one possible embodiment, once the BTS receives the roaming-likelihood value, the BTS uses this value to select a paging concatenation level for a GPM. For example, if the roaming-likelihood value is percentage as in table 300, the BTS may define ranges of percentages that each have a corresponding paging concatenation level.

As an illustration of such ranges, if the percentage for a given WCD in the preferred coverage area is zero to 10%, the BTS may select a high paging concatenation level (e.g., 8 page records per GPM). If the percentage is greater than 10% but less than 40%, the BTS may select an intermediate paging concatenation level (e.g., 4 page records per GPM). If the percentage is greater than 40%, the BTS may select a low paging concatenation level by disabling paging concatenation entirely.

It should be understood that this is but one example of how paging concatenation may be adjusted based on a roaming-likelihood value, and that many other configurations are within the scope of the invention. For instance, the paging concatenation level may be determined by a device other than a BTS.

FIG. 6 is another flow chart 600 illustrating a method according to an example embodiment that may also reduce the usage of non-preferred wireless coverage areas by adjusting paging concatenation. In particular, FIG. 6 illustrates an embodiment in which paging concatenation is either enabled or disabled in a preferred wireless coverage area, depending upon the roaming-likelihood value for the WCD when the WCD is served by the preferred coverage area. More specifically, at step 602, a RAN component may receive an indication that a GPM should be sent to a first WCD. Responsive to receiving the indication, the RAN component may determine a roaming-likelihood value for the first WCD, as shown by step 604. The RAN component may then compare the roaming-likelihood value to a threshold value, as shown by step 606. If the RAN component determines that the roaming-likelihood value is greater than the threshold value (and thus that first WCD is more likely to begin roaming), then the RAN component may disable paging concatenation for the GPM transmitted to the first WCD, as shown by step 608. On the other hand, if the RAN component determines that the roaming-likelihood value is less than the threshold value (and thus that the first WCD is less likely to begin roaming), then the RAN component may enable paging concatenation for the GPM, as shown by step 610. Thus, the RAN component may apply the appropriate paging concatenation (if any) to the GPM, and transmit the GPM via the paging channel, as shown by step 612.

In some example methods, such as those shown in FIGS. 5 and 6, the function of determining a page-concatenation level for the page for the page may be accomplished using various techniques. For example, a base station in the RAN may select either (a) no concatenation (e.g., by disabling concatenation) or (b) a predetermined page-concatenation level (e.g., by enabling concatenation). Alternatively, the page-concatenation level may be selected from a plurality of available page-concatenation levels. In a further aspect of exemplary methods, transmission of the page may be implemented by the base station inserting a page record into a GPM in which the determined level of concatenation is applied. As another example, the network may select a page-concatenation level corresponding to no concatenation, and thus include the page record in a GPM in which no concatenation is applied to the page records. Other examples are also possible.

It should be understood that flow charts 400, 500, and 600 are non-limiting embodiments. Thus, more or fewer steps than shown in may be used in each of these flow charts without departing from the scope of the invention. Additionally, each and any of these steps may be repeated one or more times, or may occur in a different order than shown in FIG. 4, 5, or 6. Further, flow charts 400, 500, and 600 may be combined with one another, in whole or in part, also without departing from the scope of the invention.

VII. CONCLUSION

Example embodiments have been described above. Those skilled in the art will understand, however, that changes and modifications may be made to these embodiments without departing from the true scope and spirit of the invention, which is defined by the claims.

What is claimed is:

1. A method comprising:
    a radio access network (RAN) operated by a first service provider determining that a page should be transmitted to a first wireless communication device (WCD) in a preferred coverage area of the RAN;
    before transmission of the page, the RAN determining a roaming-likelihood value for the first WCD;
    the RAN using the roaming-likelihood value as a basis for determining a page-concatenation level for the page; and
    the RAN concatenating the page according to the determined page-concatenation level and then transmitting the page.

2. The method of claim 1, wherein the roaming-likelihood value for the first WCD indicates how likely the first WCD is to roam to a non-preferred wireless coverage area operated by another server provider, while the first WCD is operating in the preferred wireless coverage area.

3. The method of claim 1, wherein the method is carried out by a base station in the RAN.

4. The method of claim 1, wherein a switch in the RAN determines the roaming-likelihood value for the first WCD, wherein the switch has access to a table that maps WCD identifiers to respective handoff data associated with each respective WCD identifier, and wherein determining the roaming-likelihood value for the first WCD comprises the switch:
    determining a WCD identifier of the first WCD;
    looking up the determined given WCD identifier in the table; and
    based on given respective handoff data that is stored in the table and associated with the given WCD identifier, determining that, in the past, the first WCD has been handed off from the preferred wireless coverage area to any one of the group of one or more non-preferred wireless coverage areas.

5. The method of claim 1, wherein the roaming-likelihood value comprises a percentage representing how often the first WCD has been handed off from a preferred wireless coverage area operated by the first service provider to a non-preferred wireless coverage area operated by another server provider.

6. The method of claim 1, wherein using the roaming-likelihood value as a basis for determining the page-concatenation level for the page comprises:
    determining whether or not the roaming-likelihood value is above a threshold value;
    if the roaming-likelihood value is above the threshold value, then enabling concatenation for the page; and
    if the roaming-likelihood value is below the threshold value, then disabling concatenation for the page.

7. The method of claim 1, wherein the RAN has access to a database mapping each of a plurality of ranges of roaming-likelihood values to a corresponding page-concatenation level, wherein using the roaming-likelihood value as a basis for determining the page-concatenation level for the page comprises the RAN accessing the database to determine the page-concatenation level that corresponds to the roaming-likelihood value for the first WCD.

8. The method of claim 7, wherein:
    if the roaming-likelihood value is within a lower range, then the corresponding page-concatenation level is a first page-concatenation level;
    if the roaming-likelihood value is within an intermediate range, then the corresponding page-concatenation level is a second page-concatenation level, wherein concatenating according to the second page-concatenation level results in a lesser amount of concatenation than concatenating according to the first page-concatenation level; and
    if the roaming-likelihood value is within an upper range, then the corresponding page-concatenation level is a third page-concatenation level, wherein concatenating according to the third page-concatenation level results in a lesser amount of concatenation than concatenating according to the second page-concatenation level.

9. The method of claim 8, wherein the page is transmitted in a General Page Message (GPM), wherein concatenating according to the first page-concatenation level comprises concatenating such that up to eight pages can be included in the GPM, wherein concatenating according to the second page-concatenation level comprises concatenating such that up to four pages can be included in the GPM, and wherein concatenating according to the third page-concatenation level comprises disabling concatenation so that no concatenation is applied to the page.

10. The method of claim 1:
    wherein the method is performed by a switch in the RAN;
    wherein determining a roaming-likelihood value for the first WCD comprises a switch in the RAN querying a table storing roaming data for roaming data of the first WCD and determining the roaming-likelihood value from the roaming data; and
    wherein the method further comprises the switch sending the roaming-likelihood value to at least one base station in the RAN, wherein the base station uses the roaming-likelihood value as a basis for determining the page-concatenation level for the page, concatenates the page according to the determined page-concatenation level, and then transmits the concatenated page.

11. The method of claim 1:
    wherein the method is carried out by a base station in the RAN;
    wherein determining a roaming-likelihood value for the first WCD comprises a base station receiving the roaming-likelihood value from a switch in the RAN; and
    wherein the base station uses the roaming-likelihood value as a basis for determining the page-concatenation level for the page, concatenates the page according to the determined page-concatenation level, and then transmits the concatenated page.

12. A system comprising:
    a non-transitory tangible computer-readable medium; and program instructions stored in the tangible computer-readable medium and executable by at least one processor to:
  (a) determine that a radio access network (RAN) should transmit a page to a first wireless communication device (WCD) in a preferred coverage area of the RAN, wherein the RAN is operated by a first service provider;
  (b) before transmission of the page, determine a roaming-likelihood value for the first WCD;
  (c) use the roaming-likelihood value as a basis to determine a page-concatenation level for the page; and
  (d) concatenate the page according to the determined page-concatenation level and then transmit the page.

13. The system of claim 12, wherein the roaming-likelihood value for the first WCD indicates how likely the first WCD is to roam to a non-preferred wireless coverage area operated by another server provider, while the first WCD is operating in the preferred wireless coverage area.

14. The system of claim 12, wherein the system comprises a base station in the RAN, wherein the base station includes the tangible computer-readable medium.

15. The system of claim 12, wherein the program instructions stored in the tangible computer-readable medium and executable by at least one processor to determine the roaming-likelihood value for the first WCD comprise program instructions stored in the tangible computer-readable medium and executable by at least one processor to:
  determine a WCD identifier of the first WCD;
  query a table that maps WCD identifiers to respective handoff data associated with each respective WCD identifier to determine the WCD identifier of the first WCD; and
  based on handoff data that is stored in the table and associated with the WCD identifier of the first WCD, determine the roaming-likelihood indicator, wherein the roaming-likelihood indicator indicates how often the first WCD has been handed off from a preferred wireless coverage area served by the first service provider to a non-preferred wireless coverage area served by another service provider.

16. The system of claim 12, wherein the program instructions stored in the tangible computer-readable medium and executable by at least one processor to use the roaming-likelihood value as a basis to determine a page-concatenation level for the page comprise program instructions stored in the tangible computer-readable medium and executable by at least one processor to:
  determine whether or not the roaming-likelihood value is above a threshold value;
  if the roaming-likelihood value is above the threshold value, then enable concatenation for the page; and
  if the roaming-likelihood value is below the threshold value, then disable concatenation for the page.

17. The system of claim 12, wherein the program instructions stored in the tangible computer-readable medium and executable by at least one processor to use the roaming-likelihood value as a basis to determine a page-concatenation level for the page comprise program instructions stored in the tangible computer-readable medium and executable by at least one processor to:
  if the roaming-likelihood value is within a lower range, then the select a first page-concatenation level;
  if the roaming-likelihood value is within an intermediate range, then select a second page-concatenation level, wherein concatenating according to the second page-concatenation level results in a lesser amount of concatenation than concatenating according to the first page-concatenation level; and
  if the roaming-likelihood value is within an upper range, then select a third page-concatenation level, wherein concatenating according to the third page-concatenation level results in a lesser amount of concatenation than concatenating according to the second page-concatenation level.

18. A system comprising:
  one or more base stations in a radio access network (RAN) operated by a first service provider, wherein each base station is configured to page wireless communication devices (WCDs) operating in a coverage area served by the base station; and
  a switch in a radio access network (RAN) operated by a first service provider, wherein the switch is configured to:
    (a) determine that the RAN should transmit a page to a first WCD in a preferred coverage area of the RAN;
    (b) before transmission of the page, determine a roaming-likelihood value for the first WCD; and
    (c) send the page to the one or more base stations for transmission to the first WCD; and
    (d) in association with sending the page to the one or more base stations, send the roaming-likelihood value to the one or base stations;
  wherein each of the one or more base stations is configured to use the roaming-likelihood value as a basis to determine a page-concatenation level for the page, concatenate the page according to the determined page-concatenation level, and then transmit the page.

19. The system of claim 18, wherein the roaming-likelihood value for the first WCD indicates how likely the first WCD is to roam to a non-preferred wireless coverage area operated by another server provider, while the first WCD is operating in the preferred wireless coverage area.

20. The system of claim 18, wherein the roaming-likelihood value for the first WCD comprises a percentage representing how often the first WCD has been handed off from a preferred wireless coverage area operated by the first service provider to a non-preferred wireless coverage area operated by another server provider.

* * * * *